(12) United States Patent
Moench (10) Patent No.: US 12,343,683 B2
(45) Date of Patent: Jul. 1, 2025

(54) ROTARY FILTER APPARATUS FOR ROLL-TO-ROLL NANOMATERIAL DISPERSION PAPERMAKING

(71) Applicant: Bulk Nano Processing LLC, Clearwater, FL (US)

(72) Inventor: Michael Andrew Moench, Clearwater, FL (US)

(73) Assignee: Bulk Nano Processing LLC, Clearwater, FL (US)

( * ) Notice: Subject to any disclaimer, the term of this patent is extended or adjusted under 35 U.S.C. 154(b) by 0 days.

(21) Appl. No.: 18/514,909

(22) Filed: Nov. 20, 2023

(65) Prior Publication Data

US 2024/0091713 A1    Mar. 21, 2024

Related U.S. Application Data

(63) Continuation of application No. 16/341,999, filed as application No. PCT/US2017/056636 on Oct. 13, 2017, now abandoned.

(60) Provisional application No. 62/408,434, filed on Oct. 14, 2016.

(51) Int. Cl.
| | |
|---|---|
| *B01D 63/16* | (2006.01) |
| *B01D 67/00* | (2006.01) |
| *B01D 69/12* | (2006.01) |
| *B01D 71/02* | (2006.01) |
| *B01D 71/36* | (2006.01) |
| *B01D 71/50* | (2006.01) |
| *B01D 71/56* | (2006.01) |
| *C01B 32/15* | (2017.01) |

(52) U.S. Cl.
CPC ....... *B01D 63/16* (2013.01); *B01D 67/00043* (2022.08); *B01D 67/0086* (2013.01); *B01D 69/1216* (2022.08); *B01D 71/0211* (2022.08); *B01D 71/36* (2013.01); *B01D 71/50* (2013.01); *B01D 71/56* (2013.01); *C01B 32/15* (2017.08); *B01D 2315/02* (2013.01)

(58) Field of Classification Search
CPC .............. B01D 63/16; B01D 67/00043; B01D 67/0086; B01D 69/1216; B01D 71/0211; B01D 71/36; B01D 71/50; B01D 71/56; B01D 2315/02; B01D 67/00046; B01D 33/06; B01D 33/067; B01D 2201/282; B01D 35/30; B01D 46/26; B01D 33/15; B01D 33/155; B01D 61/22; B01D 65/02; B01D 2311/24; B01D 2311/26; B01D 33/073; B01D 33/74; B01D 33/80; B01D 33/48; C01B 32/15; D21F 9/04; D21F 11/06; D21F 11/08; C02F 11/126

See application file for complete search history.

*Primary Examiner* — Magali P Slawski
*Assistant Examiner* — Bernadette Karen McGann
(74) *Attorney, Agent, or Firm* — Christopher Paradies; Paradies Law P.A.

(57) ABSTRACT

An apparatus for roll-to-roll nanomaterial dispersion papermaking includes a suction pressure for consolidating nanomaterials on a fluid permeable filter in one region of the filter and an opposite pressure region or regions for separating a mat of the consolidated nanomaterials and transferring the mat to a transfer roller. A transfer roller may have a suction pressure within the transfer roller to help transfer the mat from the filter to the transfer roller, for example. An inlet port distributes nanomaterials using row and zone inlets, for example.

20 Claims, 9 Drawing Sheets

ROTARY FILTER APPARATUS FOR ROLL-TO-ROLL NANOMATERIAL DISPERSION PAPERMAKING

CROSS-RELATED INVENTIONS

This application is a continuation of U.S. Non-Provisional Ser. No. 16/341,999 filed Apr. 15, 2019 which is a 371 U.S. national phase application of International Application PCT/US2017/056636 filed Oct. 13, 2017 which claims the benefit of the filing date of U.S. Provisional No. 62/408,434, which was filed on Oct. 14, 2016, which is incorporated by reference herein in its entirety.

FIELD OF THE INVENTION

The field relates to papermaking, especially "bucky paper" made of nanostructures, such as nanotubes, or other nanomaterials.

BACKGROUND

U.S. Pat. No. 7,459,121 discloses a known method for continuous production of a nanotube mat. However, the disclosed apparatus and method has difficulty in removing the mat from the drum without damaging the mat, such as by tearing or buckling the mat. U.S. Pat. Publ. No. 2011/0111279 discloses a binder-free nanocomposite material using nanotubes, such as carbon nanotubes. The publication discloses a method of suspending nanotubes using sonication and surfactants or other methods. A flow cell sonication process is disclosed, in particular, with additional particles added to create a stable or semi-stable suspension. The references disclose that a mat is made by filtering the suspension through a microporous membrane. The publication discloses using several suspensions to provide a layer-by-layer composite structure. However, this publication does not disclose a process that can produce continuous mats or that can alter the composition of the mat in other ways. Instead, the process is a batch process for forming sheets.

U.S. Pat. Publ. No. 2013/0270180 discloses a process for producing a continuous membrane including nanowires. The process uses a belt and rollers similar to a process of papermaking with cellulose fibers called dewatering. However, this publication discloses a "knife" (as used in applying coatings) to spread and disperse a dispersion on a porous substrate surface or, in the alternative, the publication mentions, but does not disclose, the following processes: extrusion, slot coating, curtain coating or gravure coating processes that are, according to the reference, known in the art. The reference discloses known binders and conditioners, such as complexing agents and reactive bonding materials. This publication discloses the importance of a binder for making its porous ceramic membranes using its particular chemistry to make inorganic polymer-like crosslinking. While this publication discloses a process amendable to continuous fabrication of sheets, it fails to disclose any rotary drum or inlets capable of directing a suspension and/or additives to change the composition of a continuous mat, locally. Instead, the entire ceramic thickness is dispensed from the knife (or other dispenser) at one time.

SUMMARY

A fluid suspension of nanomaterials is formed that disperses the nanomaterials, such as exfoliated graphene, graphene oxide platelets, single-walled and multi-walled nanotubes, nanofibers, micro- or nano-fibrillated cellulose, nanocrystalline cellulose, metal particles, quantum dots, ceramic particles, biomaterial particles, chitins, such as chitosan, nanowires, such as silicon, carbon, germanium and other nanowires, nanoclays, such as montmorillonite, bentonite, kaolinite, hectorite and halloysite, proteins, enzymes, antibodies, cellular materials, hemoglobin, DNA, RNA, liposomes, ribosomes, viruses, bacteria, marking and tagging agents, and combinations of these throughout the suspension while controlling agglomeration, if agglomeration is allowed. Combinations and permutations of selected nanomaterials depend on each particular application and the type of "buckypaper" desired. In one example, nanomaterials comprise primarily nanotubes and materials for dispersing the nanotubes in a liquid suspension and for binding the nanotubes after the nanotubes are consolidated into a mat. For example, surfactants, solvents, monomers and polymers may be added to help prevent agglomeration of nanomaterials. In one example, the nanotubes are carbon nanotubes, but other types of nanotubes may be used, such as carbon, boron, molybdenum and other elements capable of forming nanotubes, alone or as borides, nitrides, carbides or the like.

In one example, a batch process introduces the liquid suspension of nanotubes into an apparatus comprising a rotary filter. Alternatively, a continuous process introduces additional fluid suspension with additional nanotubes as the process continues to deposit nanotubes on the surface of the rotary filter. The rotary filter is rotated, mechanically or fluidically. Pores in the rotary filter allow fluid from the suspension to pass through the pores while at least some of the nanotubes suspended within the fluid collect on a surface of the rotary filter. Preferably, all of the nanomaterials are deposited onto the rotary filter once a mat layer is formed on the rotary filter.

A nanotube mat is formed on the surface of the rotary filter, while the surface of the rotary filter is rotated through the suspension. The fluid is drawn through the pores by a pressure differential. The pressure differential is established by a pump that draws the fluid through a portion of the rotary filter that is disposed in the fluid suspension. As the fluid is drawn through the rotary filter, a mat of nanotubes is formed on the surface of the filter, while the filter continues to rotate. As the portion of the filter rotates, the thickness of the nanotube mat increases.

A block shields a portion of the rotary filter from the suction produced by the pump, when the portion of the filter with a nanotube mat reaches the location of the block, the pressure difference decreases and fluid is not drawn through the portion of the filter shielded by the block or the rate of fluid transfer is much less, if some pressure differential still draws some fluid through the mat and the rotary filter.

In one example, the block includes a backwash section that provides a reverse pressure differential, causing fluid to pass from the backwash out through the rotary filter, rather than radially inwardly. This backwash provides a force that separates the nanotube mat from the surface of the rotary filter. In one example, a peeling roller is provided that provides a pressure differential along an arcuate surface of the peeling roller, which provides a suction pressure that draws the nanotube mat onto the peeling roller. In one example, the peeling roller has another arcuate region where the pressure differential is reversed, and the nanotube mat is separated from the surface of the peeling roller. In one example, a transfer roller is arranged to apply a transfer film onto an exposed surface of the nanotube mat as the mat is in contact with the peeling roller. Then, the nanotube mat and the transfer film, on one side of the mat, are directed to a reel and are wound onto the reel for transport and further processing, for example.

In one example, fluid is drawn by a pump through a port in fluid communication with the portion of the surface of the rotary filter passing through the fluid suspension of nanotubes. For example, a portion of a cylindrical rotary filter that is shielded by a block may be exposed to a lower pressure differential, no pressure differential or a reverse pressure differential. The reverse pressure differential may contribute to separation of the nanotube mat from the surface of the rotary filter, for example. In one example, separation is aided by a peeling roller that has a pressure differential that draws the nanotube mat onto the peeling roller.

Alternatively, the peeling roller may comprise a pair of rollers and a belt. The belt may be made of a porous material, such as a Teflon or other non-stick mesh that contacts the surface of the nanotube mat, such that suction through the mesh can help to peel the nanotube mesh from the rotary filter. In one example, a transfer film is applied to the exposed side of the nanotube mat at a second roller. For example, the second roller may have a reverse pressure differential that helps to separate the transfer film and the nanotube mat from the belt, and the mat and transfer film may be directed to a reel for transport and/or further processing.

In another example, instead of directing the nanotube mat to a transfer film and a reel, the nanotube mat is separated from the rotary filter and is directed to a second rotary filter in a second fluid suspension. In one example, this may be repeated with subsequent suspensions or processing. In this way, the nanotube mat may be thickened, consolidated, functionalized or otherwise further processed. Each subsequent rotary filter or drum may use a suction pressure differential to adhere the mat onto a roller, rotary filter or drum and/or reverse pressure differential to peel the mat from a roller, rotary filter or drum. Then, a transfer film and transfer roller may be used to transfer the processed mat to a reel for transport or further processing.

BRIEF DESCRIPTION OF THE DRAWINGS

The following drawings are illustrative examples and do not further limit any claims that may eventually issue.

When the same reference characters are used, these labels refer to similar parts in the examples illustrated in the drawings.

DETAILED DESCRIPTION

Figure 1:
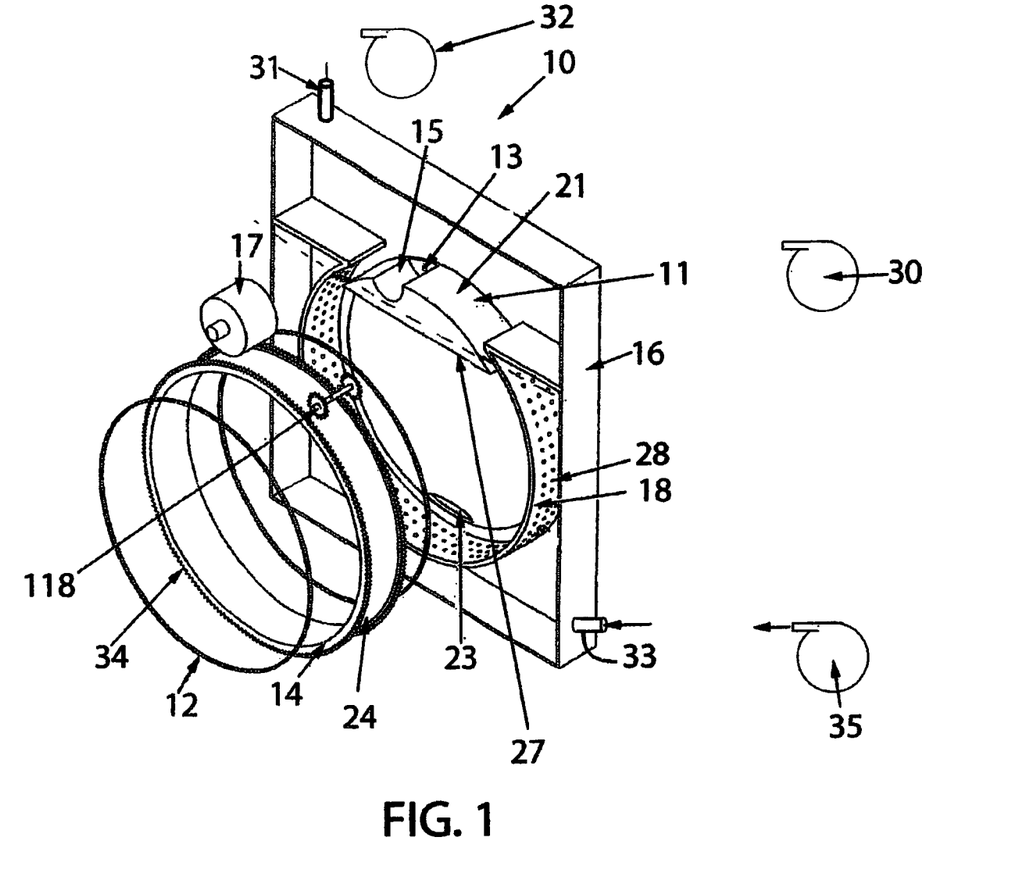
FIG. 1 illustrates an exploded view of an example of a rotary filter apparatus for roll-to-roll nanomaterial dispersion papermaking.
Figure 2:
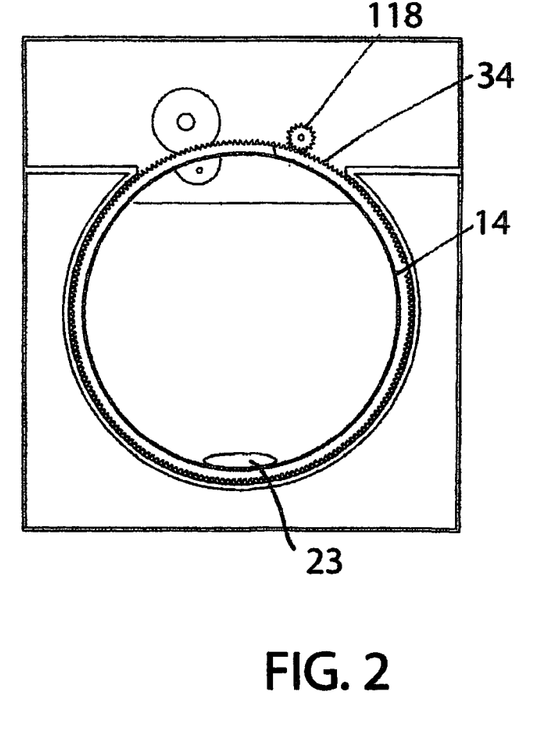
FIG. 2 illustrates a front view of the example shown in FIG. 1.
Figure 3:
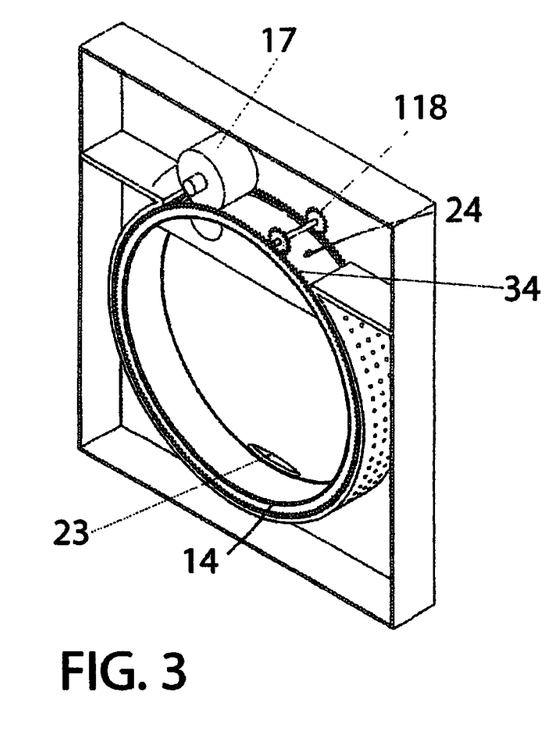
FIG. 3 illustrates a perspective view of the example shown in FIGS. 1 and 2.
Figure 4:
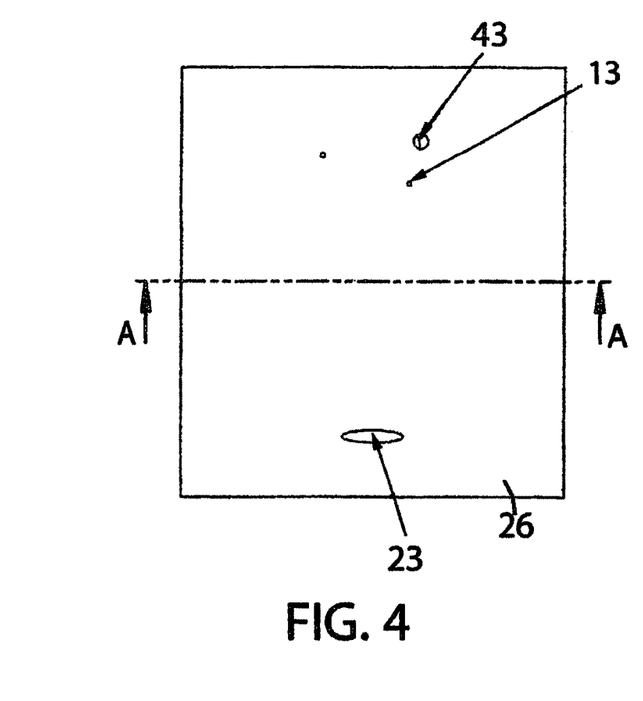
FIG. 4 illustrates a back view of the example shown in FIG. 2.
Figure 5:
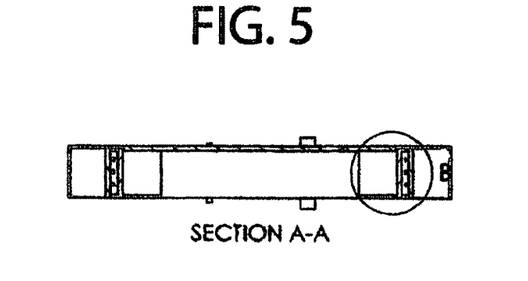
FIG. 5 illustrates a cross sectional view of the example shown in FIG. 4.
Figure 6:
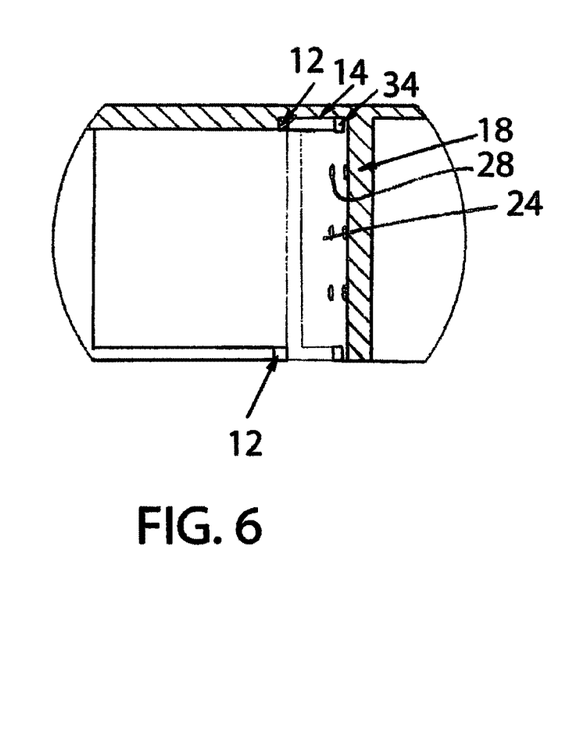
FIG. 6 illustrates a detailed view of a portion of the example shown in FIG. 5.

The example of an apparatus 10 in FIG. 1 shows how rotary seals 12 are assembled with a rotary filter 14 within a housing 16 having a fluid port 23 fluidically coupled with a pump 30 that provides a suction pressure differential along an arcuate region. The arcuate region may be comprised of a barrier 18 with a plurality of ports 28 that allow a nanomaterial suspended in a fluid to pass through the ports 28, unobstructed. The rotary filter 14 is comprised of a material having a porous surface 24 that allows suspension fluid, such as a solvent, to pass through but blocks at least some of the nanomaterials from passing through the porous surface 24. For example, the porous surface may be comprised of a porous polymer membrane, such as a polytetrafluoroethylene polymer, a nylon polymer or a combination thereof. For example, the porous surface may be comprised of a structural mesh with a porous polymer membrane supported by the mesh, which may be a metal mesh, for example. The rotary seals seal the sides of the filter, such that fluid passes through, and preferably not around, the filter surface 24. The mechanism for rotating the rotary filter may comprise a mechanical or fluidic drive. For example, FIG. 1 shows a drive gear 118 that engages gear teeth 34 on the circumference of the rotary filter 14, for example. This simplifies the mechanism for rotating the rotary filter, allowing the drive gear 118 to be disposed out of the suspension fluid. For example, a simple worm gear may be used to cause the rotary filter to rotate, without the need for additional seals. A block 11 has an arcuate upper surface 21 that extends above the fluid level in the housing 16 and a flat lower surface 27 that extends below the fluid level in the housing 16. The arcuate upper surface 21 is interrupted by a cylindrical cutaway 15 that provides a zone of reverse pressure differential provided by fluid entering through the backwash inlet 13 from the pump 30, for example. Alternatively, the cutaway may be other shapes than cylindrical, such as a slot, a wedge or the like. The cutaway 15 is sealed, likewise, by rotary seals 12, and provides a positive, separation pressure that assists the peeling roller 17 in the process of peeling a nanomaterial mat from the surface 24 of the rotary filter 14. FIG. 2 shows an example of how the drive gear 18 engages the teeth 34 of the rotary filter 14. In FIG. 3, the perspective view shows how the peeling roller 17 engages a mat on the surface 24 of the rotary filter 14, for example. FIG. 4 shows the back surface 26 of the housing 16 showing the location of the fluid port 23 and the backwash port 13. A hole 43 for the shaft of the peeling roller 17 is shown, also. The line A-A identifies a cross sectional view of the apparatus 10 that is shown in FIG. 5. A detailed view of a portion of the cross sectional view of FIG. 5 is shown in FIG. 6 and represents the portion circled in FIG. 5. In FIG. 6, for example, a cross sectional view of the rotary filter 14 is shown that illustrates in detail how the rotary seals 12 seal the low pressure side of the apparatus 10 from the comparatively higher pressure side, which may be greater than 1 atm by introducing a pressurized gas, such as nitrogen or air, above the volume of liquid, using a pump 32 to pump air into the high pressure side through high pressure inlet 31, for example. Alternatively, the higher pressure side may be standard atmospheric pressure and whatever pressure is introduced by the fluid, itself, and the low pressure side may be less than 1 atm, drawing the liquid through the rotary filter, using the fluid suction pump 30, for example.

In one example, a suspension inlet port 33 is used to introduce new suspension fluid into the fluid volume of the apparatus, using a suspension pump 35, which pumps fluid suspension into the liquid volume at a pressure greater than the pressure of the combined fluid head and the pressure of any gas introduced by the high pressure pump 32.

In addition to port 33 or alternatively to port 33, ports 28 may direct fluid directly through the barrier 18. In this example, the ports 28 may be selected such that the ports 28 do not obstruct the flow of the nanomaterials suspended in the fluid from reaching the surface 24 of the rotary filter 14, for example. In this example, the seal keeps fluid within the barrier 18, and ports 28 may be connected by tubes or lines to a distribution hub, such as a splitter, which directs a certain amount of the suspension to each of the ports 28. The pump directs fluid and nanomaterials through the tubes or lines to exit from the ports 28. In one example, there may be a plurality of ports coupled with reservoirs or sources of more than one type of suspension, which may allow for an engineered deposition of nanomaterials and additives onto the surface 24. In this way, the engineered "buckypaper" may have channels and vias manufactured into the mat during the deposition process that forms the mat. For example, two different nanomaterial suspensions may be pumped by two different pumps through two different sonicators. A distribution hub may direct the two different nanomaterial suspension to a plurality of different ports 28, depending on where the nanomaterials are to be deposited on the porous surface 24 of rotary filter 14.

Figure 11:
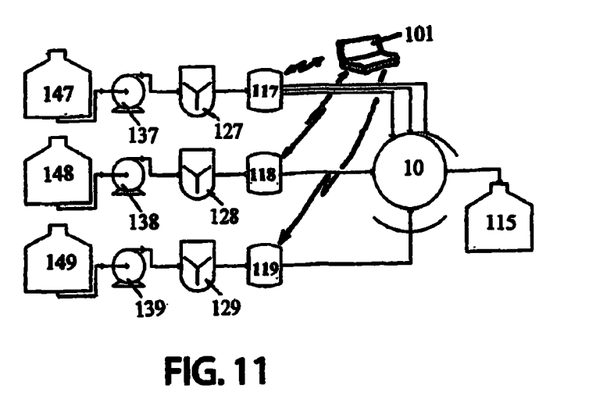
FIG. 11 schematically illustrates another example that controls valves/splitter (hubs) by computer.

For example, FIG. 11 provides a schematic illustration of a system with three different nanomaterials, each contained in a separate reservoir 147, 148, 149. Each of the reservoirs are fluidically coupled with a respective pump 137, 138, 139 that pumps a respective one of the nanomaterial suspension to a sonicating mixer 127, 128, 129. The sonicating mixer may be programmable to manage the amount of agglomeration and deagglomeration that occurs within the mixer. Also, additional additives may be added to the reservoir and/or the mixer to control agglomeration/deagglomeration, for example. Each mixer is fluidically coupled with a distribution hub or splitter 117, 118, 119, which is schematically shown in one input channel being split into three output channels in the example of a first splitter 117. In one example, a splitter 117, 118, 119 may be a single hub or a series of splitters that split the nanomaterial suspension into a plurality of lines that feed individual ports 28 in the apparatus 10. An effluent that passes through the rotary filter 14 may be drawn by an effluent pump from the apparatus 10 to one or more effluent containers 115, for example.

Figure 12:
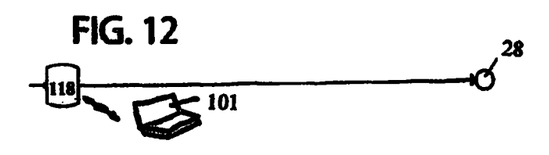
FIG. 12 schematically illustrates a single line in and a single line out under computer control (on-off only).
Figure 13:
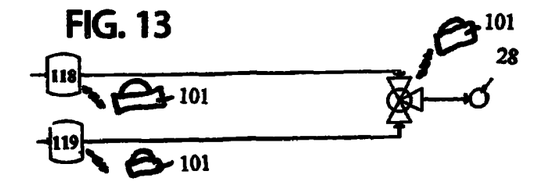
FIG. 13 schematically illustrates an on-off and mixing valve with two lines in and one line out.
Figure 14:
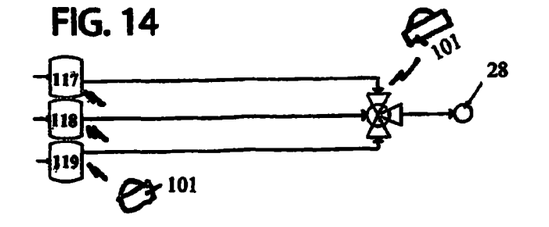
FIG. 14 schematically illustrates an on-off and mixing valve with three lines in and one line out.
Figure 15:
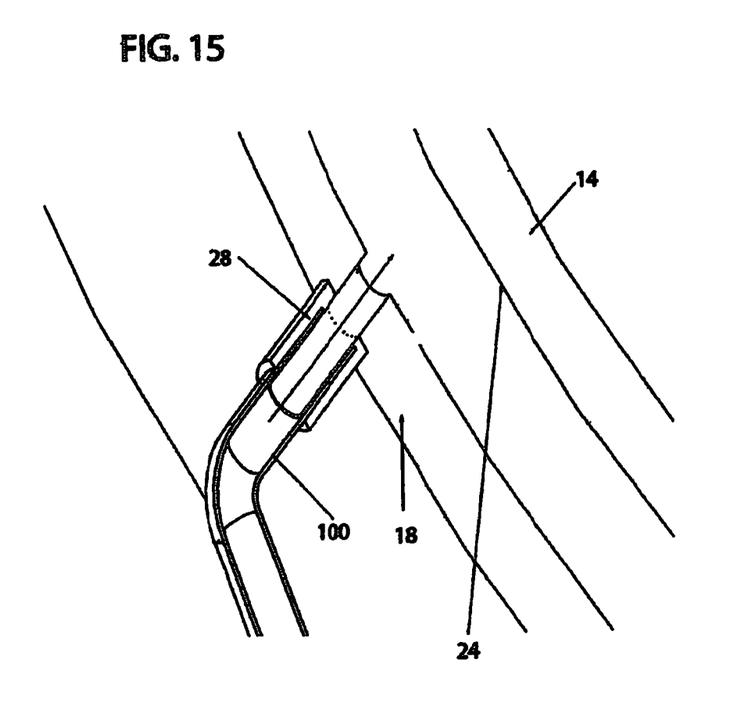
FIG. 15 schematically represents a cross section view of a coupling between a line and a port.
Figure 16:
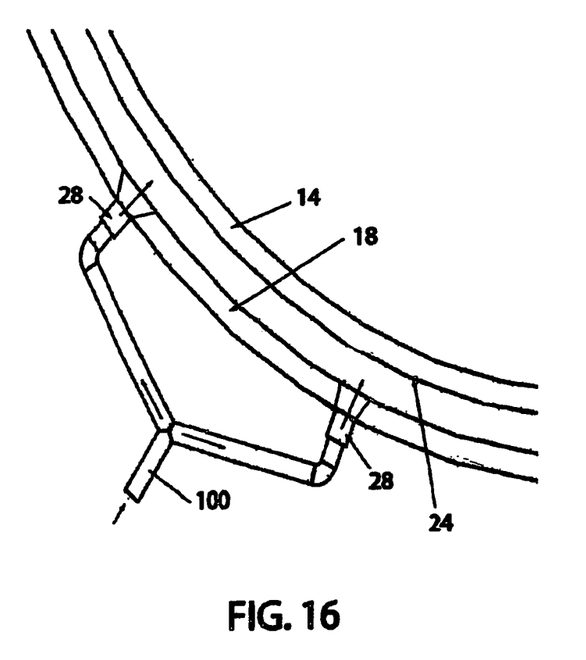
FIG. 16 schematically illustrates a single line coupled to a pair of inlet ports (non-programmable splitter).

In one example, such as illustrated schematically in FIG. 12, a single line may be directed to one or more ports 28. Alternatively, as shown in FIG. 13, two lines, such as two lines that may contain two different nanomaterial suspensions may be combined via a mixing hub or valve into one or more inlet ports 28. In yet another alternative, such as shown in FIG. 14, three lines that may contain three different materials, such as three different nanomaterial suspensions, and may be combined via a mixing hub(s) and/or valve(s) into one or more ports 28. Any combination of splitters and mixing valves may be combined to direct suspension to one or more ports 28. In one example, the splitters and mixing valves may be controlled, such as by switches, to turn on and off or switch certain ports, splitters, mixing valves and the like to control the flow of a variety of suspensions through lines feeding one or more inlet ports 28. For example, programmable valves may be operated by a computer interface or the like, as illustrated, schematically in the drawings. In the example of FIG. 15, a line 100 is fluidically coupled to an inlet port 28, for example, such that a suspension passing through the line 100 is transferred through the barrier 18 at the inlet port 28 and to the porous surface 24 of the rotary filter. Each inlet port 28 may be coupled to an individual line 100 by any conventional connector, as shown in FIG. 15, for example, or may be connected to a plurality of inlet ports 28 by an inlet hub or splitter disposed within the apparatus 10. For example, a simple splitter is shown, schematically, in FIG. 16. The splitter or hub may be disposed nearer to the barrier 18 than is obvious in the schematic of FIG. 11. Indeed, the barrier may incorporate one or more splitters or expanders. In the simplified example of FIG. 16, a single line 100 is split between two inlet ports 28 adjacent to the barrier 18. To reduce inevitable confusion, the plurality of lines 100 and inlet ports 28 are represented, schematically, in FIGS. 1, 3, and 5-6 as circles; however, any of a variety of couplings may be used to connect lines 100 with inlet ports 28, as is known in the art. However, the arrangement of the plurality of ports 28 for deposition of one or more nanomaterial suspensions on a rotary filter is not known and is not obvious. In one example, the fluid couplings are arranged in advance within a particular apparatus 10 in order to produce a single type of nanomaterial mat. In an alternative example, the distribution of nanomaterial suspensions is programmable using valves and switches to direct nanomaterial suspensions to one or more ports. For example, distribution hubs 117, 118, 119 are illustrated, schematically, as being wirelessly coupled to a laptop computer system 101 for controlling on/off and switching valves of the distribution hubs. In one example, each of the hubs/mixing valves or mixing inlets may be controlled wirelessly or by a wired connection via a computer processor or the like.

Figure 7:
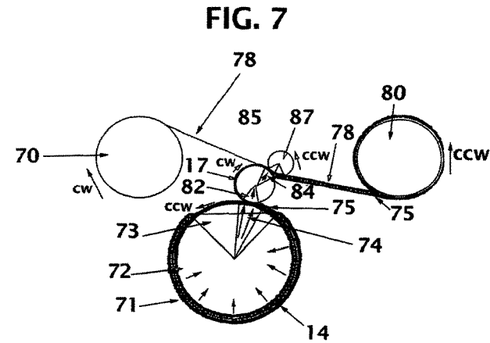
FIG. 7 illustrates a schematic of an example of a rotary filter apparatus for roll-to-roll nanomaterial dispersion papermaking omitting details of the rotary drum apparatus for clarity.
Figure 8:
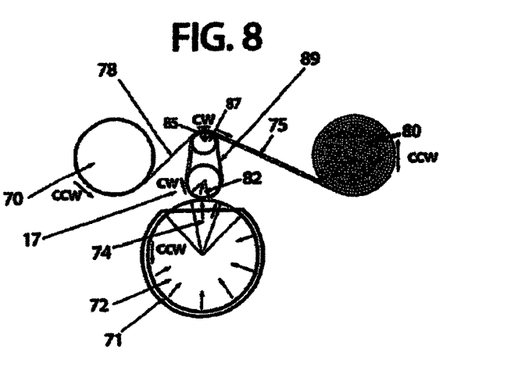
FIG. 8 illustrates a schematic of another example of a rotary filter apparatus for roll-to-roll nanomaterial dispersion papermaking omitting details of the rotary drum apparatus for clarity.
Figure 9:
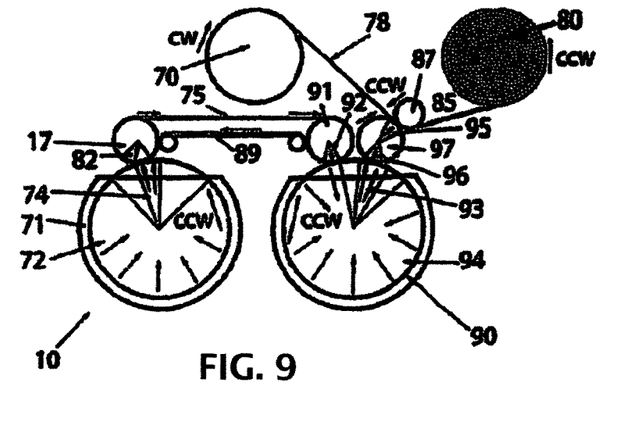
FIG. 9 illustrates a schematic of yet another example of a rotary filter apparatus for roll-to-roll nanomaterial dispersion papermaking omitting details of the rotary drum apparatus for clarity.

FIGS. 7-9 illustrate examples of systems for continuous production of nanomaterial mats. In the example of FIG. 7, the apparatus 10 is integrated into a roll-to-roll system for continuous nanomaterial papermaking. The schematic shows various zones of suction pressure (i.e. arrows pointing inward toward the center of a wheel) and release pressure (i.e. arrows pointing outward toward the circumference of a wheel). For example, suction pressure region 72 draws fluid introduced into volume 71 from inlet ports 28 (best shown in FIG. 1) through the rotary filter 14, depositing nanomaterials on the porous surface 24 of the rotary filter 14. For example, the rotary filter may utilize a polyethylene teraphthalic ester membrane or a polycarbonate track etch membrane, which is permeable to the carrier fluid but retains the nanomaterials on its surface. One or more neutral regions 73, which may be provided by a block 11, as best illustrated in FIG. 1, for example, has no pressure differential. Reverse pressure region 74 applies a release pressure to the mat to help peel the mat from the surface 24 of the rotary filter 14. In this example, the peeling roller 17, which is rotating clockwise (cw) has both a suction pressure region 82 for peeling the mat 75 from the surface 24 of the rotary filter 14 and a reverse pressure region 84 for assisting in transfer of the mat 75 to the transfer roller 87, which rotates counter clockwise (ccw). The transfer roller 87 has a suction pressure region 85. Since a transfer film 78 is supplied by a transfer film roller 70, which is rotating clockwise (cw), no reverse pressure region is needed for the transfer roller 87. FIG. 7 shows that the transfer film 78 and nanopaper 75 are directed to a reel 80, which rotates counter clockwise (ccw) for transport or subsequent processing, for example.

In an alternative example, as shown in FIG. 8, a peeling roller 17 has a single suction pressure zone 82. The mat is omitted from FIGS. 8 and 9 for clarity. A belt 89, such as a porous polytetraethylene teraphalate belt, may be used to transfer the mat (not shown) to a transfer roller 87, which has a single reverse pressure region 85, which helps to peel the mat 75 and transfer film 78 from the belt 89. This transfer roller 87 may be the same as the transfer roller 87 illustrated in FIG. 7, for example; however, in this example, the transfer roller 87 rotates clockwise (cw) and is disposed on an opposite face of the transfer film 78, for example. While the belt 89 adds a component that may be subject to wear and tear, over time, the system illustrated in FIG. 8 may be preferable to the system in FIG. 7, because the peeling roller 17 may be simplified by having only a single suction zone.

In yet another example, as illustrated in FIG. 9, for example, a multi-step process is shown. The mat 75 produced during operation of the first apparatus 10 is transferred to a second apparatus 90 for further processing, such as adding another layer of nanomaterial, consolidating and/or binding the mat or otherwise functionalizing the mat. In this example, a belt 89 connects a first peeling roller 17 and a transfer roller 91, and the first peeling roller has only a single suction pressure zone 82. The transfer roller 91 has a single reverse pressure zone 92 for transferring the mat 75 to the second rotary filter of the second apparatus 90. Then, any type of fluid or gas may be passed through the mat 75 for further processing of the mat 75 in one or more subsequent processing steps. A plurality of process steps may be combined by chaining two, three or even more rotary filters using this configuration. However, in this example, a peeling roller 97 is shown that functions similarly to the peeling roller 17 in the example of FIG. 7. The mat 75 is then peeled by this second peeling roller 97 that comprises a suction pressure zone 96 that works with reverse pressure zone 93 of the second apparatus 90 and a reverse pressure zone 95, which works with a suction pressure zone 85 of a second transfer roller 87 to apply a transfer film 78 to the mat 75. The transfer film 78 and mat 75 are then directed to a reel 80 by a transfer roller 87, which may or may not have a suction zone 85, as previously shown. The reel 80 may be used for transport or further processing, for example.

Figure 10:
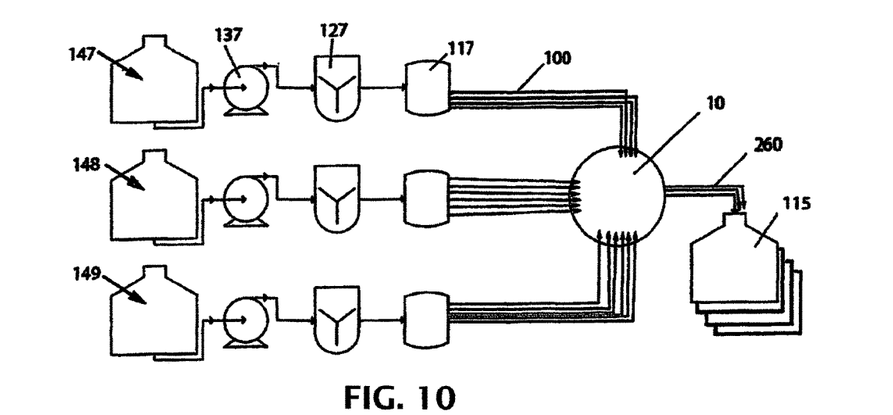
FIG. 10 schematically illustrates an example of a rotary filter apparatus sourcing a plurality of sources (feedstock).
Figure 17:
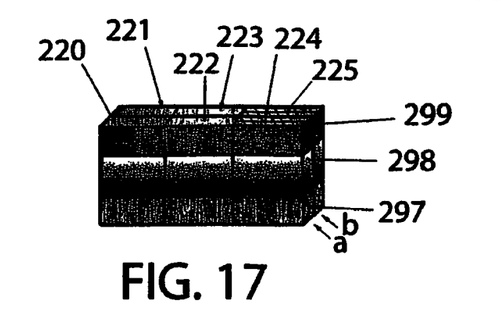
FIG. 17 schematically illustrates a simplified portion of a mat.
Figure 18:
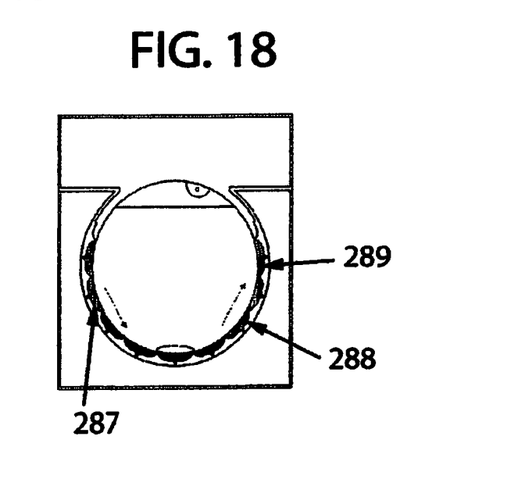
FIG. 18 illustrates inlet port zones associated with the mat of FIG. 17.

As illustrated schematically in FIG. 10, each inlet port 28, which provides an orifice passing completely through the barrier 18, may be fluidically coupled, such as by a tube and couplings, to one of a plurality of pumps 137 by a distribution hub 117, which directs a suspension containing nanomaterials directly to each inlet port 28 by a plurality of tubes or "lines" 100, as referred to herein, for example, from one or more suspension sources 147, 148, 149, such as reservoirs containing nanomaterial suspensions. In one example, a reservoir distribution system 147 includes a sonicator 127 for disbursing nanomaterials within the suspension and for controlling agglomeration. For example, when lines 100 are utilized, the volume external to the barrier 18 may be a void (devoid of any suspensions, but not necessarily a vacuum, i.e. the void may contain air or other gases or even a liquid. Lines 100, which may be tubes, such as flexible polymer tubes, may deliver a suspension fluid to each inlet port 28 or selected inlet ports. For example, each inlet port 28 may be supplied a different suspension mixture or ports may be grouped together to provide different nanomaterials and additives through the thickness of a mat as illustrated in the simplified schematic of FIG. 17, which illustrates three distinct layers 297, 298, 299 from the three zones of inlets 287 (high contrast fibers), 288 (grayed) and 289 (low contrast fibers). FIG. 18 illustrates inlet ports 28 grouped by zones. For example, the first zone 287 may comprise nanomaterials and a release agent, the second zone 288 may comprise the same or different nanomaterials and a binding agent, and the third zone 289 may comprise the same or different nanomaterials and a coloring agent and/or an adhering agent, such as a tacky substance or adhesive.

Figure 19:
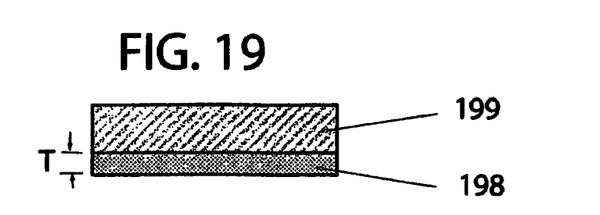
FIG. 19 illustrates a simplified cross section of a mat.
Figure 20:
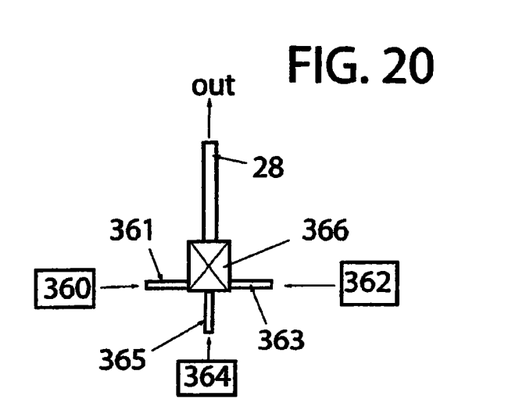
FIG. 20 schematically illustrates a mixing valve coupled to three different sources.
Figure 21:
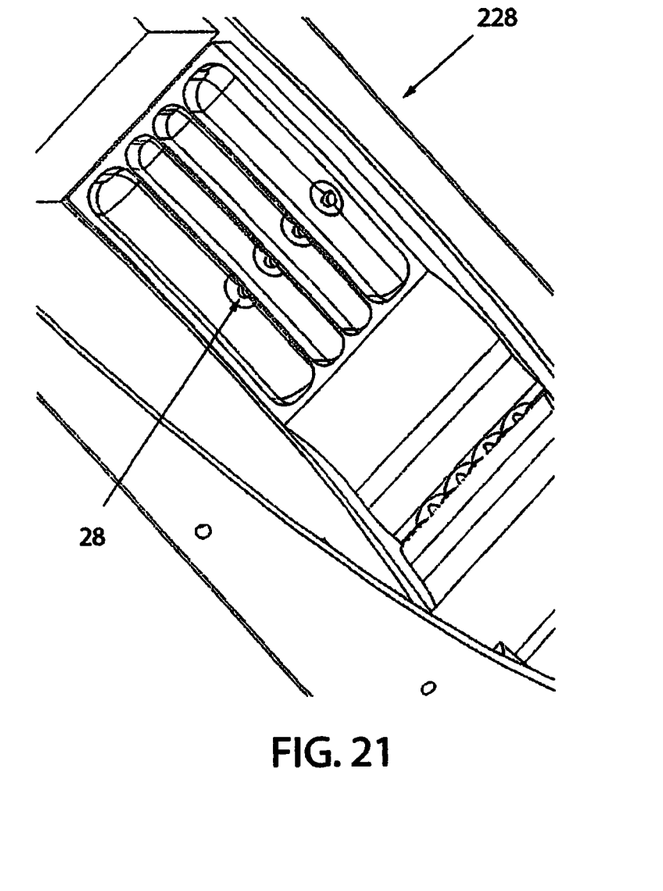
FIG. 21 illustrates an example using a partially cut-away view showing a plurality of concave inlet rows, each a portion of an inlet, and showing one of a plurality of zones, each zone having a plurality of inlets, and each of the zones being separated by dividers from each of the other zones, which zones may be integrated into a barrier of the rotary filter apparatus.

Alternatively, changes to the composition may gradually change through the thickness of the mat, rather than being divided into discreet layers, merely by selecting the distribution of lines to ports 28, as illustrated schematically by the dotted shading of FIG. 19. In FIG. 19, the dots are meant to represent an additive that has a gradient through the thickness T of the first mat layer (i.e. nearest the filter membrane). For example, a higher concentration of release agent may be present at the surface between the mat and the filter membrane to help with peeling of the mat from the membrane. In addition, this concentration may be greater at startup than later, after the mat is peeled initially. However, the illustration is not limited to this one example. There are many reasons for desiring an concentration gradient of one constituent in another through a thickness or along a length of mat.

In one example, as illustrated schematically in FIG. 19, a composition of a first portion of a continuous mat is selected by directing nanomaterials and additives through only a fraction of the ports at the start of the process. Then, the composition of the mat is changed by adding nanomaterials and/or additives from other sources having a different selection of nanomaterials and additives. For example, the first portion of the mat may have a release agent added, and a later portion of the mat may reduce or eliminate the release agent from the suspensions being directed to the filter. By including a release agent only in the first zone 287 of FIG. 18, a surface layer with a higher concentration of release agent will be produced. By controlling the amount of the additive mixed in the mixing valve, a particular concentration gradient of an additive may be obtained, for example.

For example, the schematic representation in FIG. 11 shows three different nanomaterial suspensions 147, 148, 149, coming through three different sonicators 127, 128, 129 and three different pumps 137, 138, 139, flowing to three different hubs (splitters and/or mixing valves) 117, 118, 119, from which one or more fluid lines are shown carrying nanomaterial-containing suspensions to respective inlet ports 28. For example, a bottom portion of the mat (closest to the filter membrane in the cross section of FIG. 19) may comprise nanotubes and a release agent, wherein the release agent is concentrated at the surface in contact with the filter membrane and a gradient in the concentration of the release agent extends only a short distance into the surface of the mat. A top portion may be comprises of an entirely different suspension or combination of suspensions, such as a cellulose material, which may be colored any color or white. By utilizing the mixing valves and inlet ports 28, any number of additives may be added in layers or gradients through a thickness of a mat or along the length of a mat or in any pattern along the mat. For example, a mat may comprise a printed circuit board, or the like, by controlling the layering and location of materials supplied through each of the ports 28.

In one example, as illustrated in the schematic detail of FIG. 20, each inlet port 28 may be multiplexed and/or connected by a valve 366, which may be a mixing valve, that determine the origin(s) of materials directed through inlets 28 connected to the valve by a fluid distribution line 100. Thus, the composition through each inlet 28 may be turned on or off and may be changed over time, as materials are directed through each port. By controlling the valves 366, each of the ports 28 provide a capability of making three dimensionally structured nanomaterial mats, as illustrated schematically in FIG. 17. FIG. 20 provides an example of a mixing valve with three lines in 361, 365, 363 and three sources 360, 362, 364. The valve body 366 is capable of controlling the fluid out line to an inlet 28 to mix any proportion of the three sources or to turn off and on any or all of the sources. This provides for control of concentration of suspensions and additives at one or more inlets 28 or zones. A combination of mixing valves, on-off valves and splitters may be used. Preferably, a mixing valve is a compact valve body that can be placed adjacent to the barrier/inlets. FIG. 17 schematically illustrates a volume of mat divided into layers, rows and zones. The lines between zones are added only to show the zones more clearly, as there may be a gradient between one zone and the next. The gradient may be a sharp gradient or a gradual gradient, depending on processing speed and conditions. In this simplified example, only two rows a, b are shown. Alternatively, a plurality of rows may be provided by the inlet ports 28, such as the four rows shown in FIG. 21.

The simplified example of FIG. 17 shows a volume of mat having three layers 297, 298, 299, two rows (a, b) and three zones along the length of the mat from 220, 221 to 224, 225. A first layer 297 has a first row (a) with a different composition than a second row (b). A second layer 298 shows a gradient from dark to light, which represents a concentration gradient within the second layer 298. The third layer 299 has three different zones along the length of the layer. The last zone 224, 225 is represented by cross hatching and has a different composition than the other two zones. The second zone 222, 223 is shown to have a lighter contrast showing that it has a lower concentration of one of its constituent elements. The first zone 220, 221, in contrast, has a darker shade of fibers showing that it has a higher concentration of one of its constituents. While each of the three layers shows a different variation, the variations may be mixed and matched in any of the layers by controlling the valves and the inlet zones connected to the valves. Any number of layers may be provided, and the length of zones may be adjusted, as needed, to provide a desired structure. The ultimate resolution of the three dimensionally structured mat depends on the speed of the valves, the size of the zones and the length and volume of the lines 100 connecting the valves to the inlet ports 28, for example.

FIG. 21 shows an example of a zone having a plurality of inlets 28. The view is of the inside surface of the barrier 18, with other surfaces cut away. Each of the inlets 28 is shaped to distribute the suspension over a particular row and for a particular distance. This type of distribution structure for the purpose of claim limitations is referred to as a "row and zone inlet" as the structure of each inlet is shaped to distribute suspension passing through the inlet only to a particular region on a surface 24 of the rotary filter 14 (or upon a mat of materials previously deposited thereon). A particular region may comprise a zone or a portion of a zone of any shape and size limited only to the confines of the gap between the barrier 18 and the surface 24. A row of a particular composition may be as short as a zone or as long as a continuous mat, and the length may be controlled by operation of a valve or valves. A width of a row of a particular composition is controlled by the dispersion of the suspension from an inlet or inlets. For example, a concave surface of the rows shown in FIG. 21 assist in limiting the dispersion of suspension from each of the inlets shown. A cross section of the concave surfaces of the zones shown in a perspective view in FIG. 21 are schematically represented in FIG. 18, and these zones, for example, provide the control needed, in conjunction with hubs (splitters and valves), for making mats with the types of structures shown in FIG. 17, for example.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. An apparatus for nanomaterial dispersion papermaking comprises:

- a housing;
- a porous surface, at least a portion of the porous surface being disposed within the housing;
- a seal arranged between the porous surface and a sealed portion of the housing, the seal fluidically sealing a porous filter to the sealed portion of the housing;
- a plurality of fluid ports disposed adjacent to the porous surface;
- a first reservoir of at least one reservoir wherein the first reservoir is coupled fluidically to the plurality of fluid ports, the first reservoir containing a first composition comprising a nanomaterial dispersion, wherein the nanomaterial dispersion comprises a carrier fluid and a suspension comprising at least one nanomaterial carried by the carrier fluid;
- a pump arranged to pump the nanomaterial dispersion from the first reservoir to the plurality of fluid ports;

a suction zone arranged in at least a portion of the sealed portion of the housing such that a suction pressure differential induces at least a portion of the carrier fluid of the nanomaterial dispersion to pass through the porous surface, the porous surface separating the at least a portion of the carrier fluid from the suspension when the nanomaterial dispersion is directed to the porous surface, wherein the suspension is incorporated into a mat on the porous surface while the porous surface passes through the suction zone; and a controller electronically selectively controls fluidic coupling of the first of the at least one reservoirs and the plurality of fluid ports at specific times such that a composition of the mat on the porous surface at specific, three-dimensional locations within the mat formed on the porous surface.

2. The apparatus of claim 1, wherein the nanomaterial dispersion comprises exfoliated graphene, graphene oxide platelets, single-walled nanotubes, multi-walled nanotubes, nanofibers, micro-fibrillated cellulose, nano-fibrillated cellulose, nanocrystalline cellulose, metal particles, quantum dots, ceramic particles, biomaterial particles, chitins, chitosan, nanowires, silicon nanowires, carbon nanowires, germanium nanowires, nanoclays, montmorillonite, bentonite, kaolinite, hectorite, halloysite, proteins, enzymes, antibodies, cellular biomaterials, hemoglobin, DNA, RNA, liposomes, ribosomes, viruses, bacteria, marking agents, tagging agents, or combinations of any of these.

3. The apparatus of claim 1, wherein the at least one nanomaterial comprises one or more of the following: single-walled nanotubes, multi-walled nanotubes or nanofibers.

4. The apparatus of claim 1, wherein the porous surface is arcuate, and the porous surface rotates about an axis as the porous surface passes through the suction zone.

5. The apparatus of claim 4, wherein the housing comprises a barrier wherein the plurality of fluid ports pass through the barrier.

6. The apparatus of claim 5, wherein the porous surface comprises a porous polymer membrane.

7. The apparatus of claim 6, wherein the porous polymer membrane comprises a polytetrafluoroethylene polymer, a nylon polymer or a combination thereof.

8. The apparatus of claim 5, wherein the porous surface further comprises a structural mesh and the porous polymer membrane is supported by the structural mesh.

9. The apparatus of claim 8, wherein the structural mesh is a metal mesh.

10. The apparatus of claim 1, further comprising a drive gear that engages gear teeth on a structure that supports the porous surface.

11. The apparatus of claim 10, wherein the drive gear is a worm gear and rotation of the worm gear rotates the porous surface through the suction zone.

12. The apparatus of claim 1, further comprising a backwash inlet coupled to a pump such that fluid from the backwash inlet causes a zone of reverse pressure differential providing a positive separation pressure that assists with peeling the mat from the porous surface.

13. The apparatus of claim 12, further comprising a peeling roller having a suction surface, the peeling roller being disposed at the zone of reverse pressure differential such that the suction surface of the peeling roller helps to pull the mat from the porous surface as the positive separation pressure pushes an opposite side of the mat onto the suction surface of the peeling roller.

14. The apparatus of claim 1, wherein the at least one reservoir comprises a second reservoir, and a second composition contained within the second reservoir, and the second composition is a different composition than the first composition.

15. The apparatus of claim 14, wherein the controller electronically selectively controls flow through a first valve and a second valve, the first valve selectively fluidically coupling the first composition to at least one of the plurality of fluid ports, and the second valve selectively fluidically coupling the second composition to at least one of the plurality of fluid ports.

16. The apparatus of claim 15, wherein the at least one reservoir comprises a third reservoir contains a third composition different than the second composition and the first composition, and the third composition is selectively fluidically coupled to at least one of the plurality of fluid ports via the controller controlling fluid flow through a third valve.

17. The apparatus of claim 16, wherein the first reservoir has a sonicator for keeping the suspension suspended within the carrier fluid.

18. The apparatus of claim 17, wherein the sonicator manages the amount of agglomeration and deagglomeration of the nanomaterial dispersion.

19. The apparatus of claim 18, wherein the controller controls when and at which of the plurality of fluid ports fluids from each of the first reservoir, the second reservoir and the third reservoir are directed.

20. An apparatus comprises:

a housing;

a porous surface, at least a portion of the porous surface being disposed within the housing;

a seal arranged between the porous surface and a sealed portion of the housing, the seal fluidically sealing a porous filter to the sealed portion of the housing with a suction zone arranged to induce a differential pressure;

a plurality of fluid ports disposed adjacent to the porous surface;

a first reservoir containing a first composition comprising a nanomaterial dispersion comprised of a carrier fluid and at least one nanomaterial suspended within the carrier fluid, and a second reservoir, the second reservoir comprising a second composition different than the first composition, wherein the suction zone induces at least a portion of the carrier fluid of the nanomaterial dispersion to pass through the porous surface, the porous surface separating the at least a portion of the carrier fluid from the suspension when the nanomaterial dispersion is directed to the porous surface, wherein the suspension is incorporated into a mat on the porous surface while the porous surface passes through the suction zone; and a computerized controller electronically selectively controls fluid flow between the first reservoir and at least one of the plurality of fluid ports at specific times such that a concentration of the at least one nanomaterial is deposited selectively on the porous surface at a specific location, time and duration whereby a composition of the mat formed on the porous surface comprises a three-dimensionally selectively arranged concentration of the at least one nanomaterial.

* * * * *